United States Patent
Adam et al.

(10) Patent No.: US 11,244,012 B2
(45) Date of Patent: Feb. 8, 2022

(54) COMPLIANCE BY CLUSTERING ASSETS ACCORDING TO DEVIATIONS

(71) Applicant: Kyndryl, Inc., New York, NY (US)

(72) Inventors: Constantin Mircea Adam, Fairfield, CT (US); Muhammed Fatih Bulut, Ossining, NY (US); Milton H. Hernandez, Tenafly, NJ (US); Maja Vukovic, New York, NY (US)

(73) Assignee: KYNDRYL, INC., New York, NY (US)

( * ) Notice: Subject to any disclaimer, the term of this patent is extended or adjusted under 35 U.S.C. 154(b) by 132 days.

(21) Appl. No.: 16/675,376

(22) Filed: Nov. 6, 2019

(65) Prior Publication Data
US 2021/0133254 A1 May 6, 2021

(51) Int. Cl.
*G06F 16/93* (2019.01)
*G06F 16/906* (2019.01)
*H04L 12/26* (2006.01)
*G06F 21/31* (2013.01)
*G06Q 30/00* (2012.01)

(52) U.S. Cl.
CPC ............ *G06F 16/93* (2019.01); *G06F 16/906* (2019.01); *G06F 21/31* (2013.01); *G06Q 30/018* (2013.01); *H04L 43/50* (2013.01)

(58) Field of Classification Search
CPC ................................ G06F 16/906; G06F 16/93
See application file for complete search history.

(56) References Cited

U.S. PATENT DOCUMENTS

| 9,208,013 | B2 | 12/2015 | Abuelsaad |
| 9,298,818 | B1 * | 3/2016 | Donneau-Golencer ...... G06F 16/68 |
| 9,344,442 | B1 * | 5/2016 | Yu .......................... H04L 63/104 |
| 9,626,277 | B2 | 4/2017 | Thangamani |
| 10,169,138 | B2 | 1/2019 | Guney |
| 10,187,326 | B1 | 1/2019 | Anand |
| 10,339,457 | B2 | 7/2019 | Ryckbosch |

(Continued)

FOREIGN PATENT DOCUMENTS

| CN | 106326024 A | 1/2017 |
| WO | 2015148328 A1 | 10/2015 |

OTHER PUBLICATIONS

Baralis et al., "NetCluster: a Clustering-Based Framework for Internet Tomography", 2009 IEEE International Conference on Communications proceedings, 5 pages.

(Continued)

*Primary Examiner* — Charles E Lu
(74) *Attorney, Agent, or Firm* — Garg Law Firm, PLLC; Rakesh Garg; Erik C Swanson

(57) ABSTRACT

Streamlining compliance reporting and remediation through clustering compliance deviations by receiving inspection scan compliance deviation report data, analyzing the inspection scan compliance deviation report data, in response to the analysis, creating normalized deviation report documents, comparing the normalized deviation report documents, in response to the comparisons, clustering the normalized deviation report documents, creating a common cluster deviation profile comprising clustered deviation reports, and generating a summary system asset compliance report comprising the common cluster deviation profile.

20 Claims, 6 Drawing Sheets

(56) References Cited

U.S. PATENT DOCUMENTS

| | | | |
|---|---|---|---|
| 2008/0294584 A1* | 11/2008 | Herz | G06Q 30/0207 |
| | | | 706/46 |
| 2010/0333168 A1* | 12/2010 | Herrod | H04L 63/20 |
| | | | 726/1 |
| 2011/0126111 A1* | 5/2011 | Gill | G06F 21/577 |
| | | | 715/736 |
| 2012/0141032 A1* | 6/2012 | Ouyang | G06K 9/00422 |
| | | | 382/187 |
| 2014/0075494 A1 | 3/2014 | Fadida | |
| 2019/0104156 A1* | 4/2019 | Barkovic | G06F 40/18 |

OTHER PUBLICATIONS

Mell et al., "The NIST Definition of Cloud Computing", Recommendations of the National Institute of Standards and Technology, Special Publication 800-145, Sep. 2011, 7 pages.

\* cited by examiner

COMPLIANCE BY CLUSTERING ASSETS ACCORDING TO DEVIATIONS

BACKGROUND

The disclosure relates generally to improving compliance by clustering system assets according to their compliance deviations. The disclosure relates particularly to improving compliance by streamlining compliance reporting through the clustering of system servers according to the compliance protocol deviations.

Continuous compliance (CC) is an automated process which monitors networked computing system assets. For each asset, the CC executes a set of scripts in a run list for that asset. Scripts can be coded in JAVA, or other appropriate programming languages. CC works in two modes: inspection mode, where the CC scans the assets and reports detected compliance deviation; and enforcement mode, the CC remedies the compliance deviations. (Note: the term(s) "JAVA" may be subject to trademark rights in various jurisdictions throughout the world and are used here only in reference to the products or services properly denominated by the marks to the extent that such trademark rights may exist.)

The decision to remediate a detected deviation is a manual one, typically made by the system client. The client reviews the deviation reports from the CC scan mode and determines which deviations to remediate, and which deviations to override. Remediation involves the enforcement of the policy settings for the server activities. Overriding provides for the application of different, non-policy settings to the server activities.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable streamlining compliance reporting and remediation/override through the clustering of system servers according to compliance protocol deviations.

Aspects of the invention include systems, methods, and computer program products which streamline compliance reporting and remediation through clustering compliance deviations by receiving inspection scan compliance deviation report data, analyzing the inspection scan compliance deviation report data, in response to the analysis, creating normalized deviation report documents, comparing the normalized deviation report documents, in response to the comparisons, clustering the normalized deviation report documents, creating a common cluster deviation profile comprising clustered deviation reports, and generating a summary system asset compliance report comprising the common cluster deviation profile.

DETAILED DESCRIPTION

Figure 1:
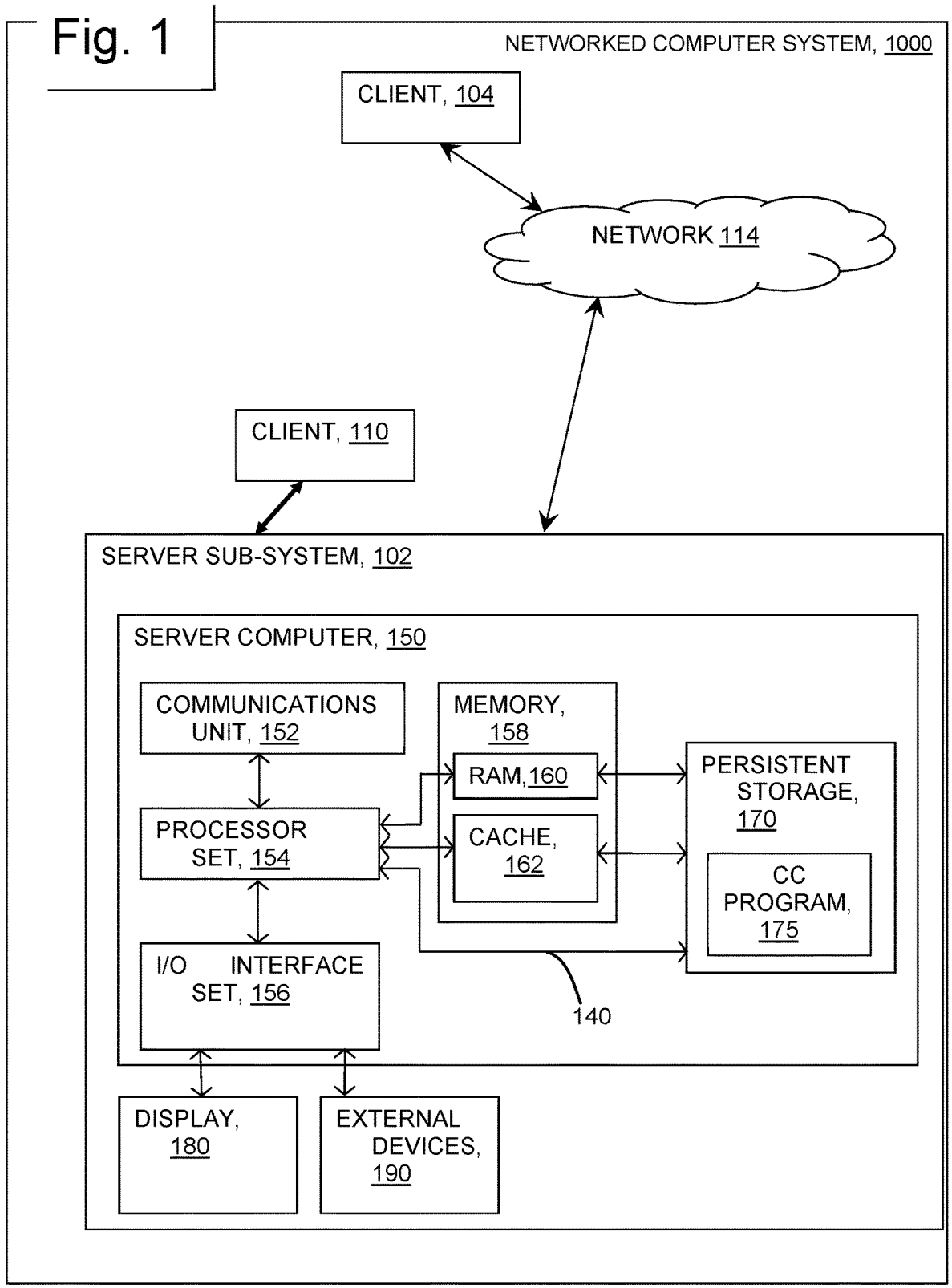
FIG. 1 provides a schematic illustration of a system, according to an embodiment of the invention.

One or more embodiments described herein can facilitate endpoint device (e.g., virtual machine, server, etc.) compliance with a specific regulation. Providers of Internet protocol (IP) services and server management can keep servers in compliance. For example, one or more embodiments described herein can provide security-based attributes of endpoint devices that include security requirements including, but not limited to: passwords, various configurations of operating systems, logins, etc.

Continuous Compliance (CC) scan mode generates a report of compliance deviations from compliance regulations across a client's system. The client typically wants to decide which deviations will be remediated and which will be overridden. The client must review the CC scan output and make these decisions. The nature of the CC scan reports makes them difficult for clients to analyze in order to make compliance remediation decisions. As an example, between 200 and 400 checks may be performed upon each system server each day. Each check may result in multiple deviations for review. A large account having a thousand servers may have hundreds of thousands or millions of deviations for review each day. An operator may detect deviation patterns when reviewing individual servers, but such review consumes considerable amounts of time and computing resources on a daily basis. As a further example, client management of deviation overrides also entails tracking all overrides so that changes can be reversed across all affected servers in the event of a relevant policy change—again across potentially millions of deviations. The human operators cannot keep up. What is needed is an automated method to reduce the dimensionality and complexity of the CC scan reports to enable more efficient client analysis of the reports and associated remediation decision making.

In an embodiment, the method makes CC scan results more manageable. System assets with similar compliance deviations are grouped in clusters. In this embodiment, instead of analyzing inspection reports on hundreds, or thousands, of assets for a client account, the method presents the clients with a report on tens of clusters of assets for review analysis and decision making.

In an embodiment, the method includes providing a graphical user interface for viewing the asset inspection reports and approving remediation activities or overriding deviation instances.

In an embodiment, the method is associated with monitoring and maintaining compliance in a client system. In this embodiment, the client system can be associated with or included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system or the like.

In an embodiment, one or more components of the system can employ hardware and/or software to solve problems that are highly technical in nature (e.g., non-compliance violation searches, non-compliance flagging, profile generation, determination and/or remediation of compliance concerns, etc.). These solutions are not abstract and cannot be performed as a set of mental acts by a human due to the processing capabilities needed to facilitate endpoint device remediation, for example. Further, some of the processes performed may be performed by a specialized computer for carrying out defined tasks related to memory operations. For example, a specialized computer can be employed to carry out tasks related to endpoint device remediation or the like.

In an embodiment, the method determines which system components are out of compliance and also determines necessary steps for remediation of the deviations. In this embodiment, the method records the set of deviations as a deviation profile for the component. Thereafter, the method writes a script that optionally remediates the deviation profile. In this embodiment, the method comprises formatting a script output by using a common format and storing (e.g., at the compliance database) the script output in a repository. In this embodiment, the method comprises determining parameters for script execution and adding the script to an evaluation script, or wrapper. The method then adds script metadata that enables the creation of a model-driven user interface for that script. In this embodiment, the method stores the scripts in a script storage element (e.g., script database) for future use relating to components and clusters of components having the same compliance deviation profile.

In an embodiment, the method generates remediation scrips according to preconfigured cookbooks (scripts) stored in a remediation language data base. In this embodiment, the method reviews the server configuration in terms of operating system and middleware running on the server, as well as the deviation and associated override. The method then gathers the script language relevant to the server configuration and deviation profile from the remediation database and generates the necessary remediation script according to remediate or override decisions related to the deviations of the profile. Override decisions provide additional configuration information related to disabling code portions related to the overridden deviation remediation. As an example, defining an override which allows user X to have a non-expiring password on server S will disable, on server S, the code portion which would otherwise cause the password of user X to expire in 90 days. In this embodiment, generated scripts are stored in association with the deviation profile and remediate or override decision metadata.

In an embodiment, the method can define change windows when assets/servers can be on-boarded, put in maintenance mode, or change environments. For example, an entity can determine when an endpoint device should be in test mode or maintenance mode. During the maintenance mode, the system can run a script on the endpoint device to determine if the endpoint device is violating any compliance rules. If the endpoint device is violating a compliance rule, then the regional entity can receive a report stating such and further analyze the set of endpoint device reports. In this embodiment, the entity can be an automated system or a human user.

In an embodiment, an account Cognitive Policy Advisor (CPA) of the system receives compliance deviation reports resulting from compliance scans of systems servers. In an embodiment, the reports include data regarding regulation and policy compliance by the servers. In an embodiment, the method scans different servers using different scripts due to differences in server configurations and applicable policies and regulations. The differences in compliance scan scripts among the set of servers yields different compliance scan reports relating to server deviations. In this embodiment, CC activities yield duplicate compliance reports for some of the system assets scanned, which the method passes to the account CPA.

In an embodiment, CC performs scans on system assets on a regular basis (e.g., daily). The scans may contain errors or be incomplete. Network errors in transferring the results of the scan, a server timeout resulting in the check results not yet being available at the time of the scan, or a server error in running the scan script can lead to missing data in the scan reports for a given day. Some scans (e.g., checking for world writable files, or detecting whether particular application software packages are installed in a non-standard manner) are computationally expensive and may be run less frequently. The method compensates for these potential issues over a set of n days rather than for a single day. For example, if n=3, and the method has not received results for check C1 from the endpoint E1 for the past 2 days, the method will still retrieve a report for check C1 on E1 that was produced 3 days ago. If, on the other side, the method received daily results for check C2 on another endpoint E2, the method will discard the earlier results (from 2 and 3 days ago) and will only keep the latest result for the check C2 on endpoint E2.

In an embodiment, the method pre-processes and analyzes the received scan reports. The pre-processing removes duplicate scan reports and data. In this embodiment, the pre-processing and analysis also aggregates large numbers of deviations for a single policy or regulation into a single deviation data point, to simplify the analysis by the regional CPA. For example, multiple password policy deviations for a single server are aggregated into a single data point of password deviations for that server. In this embodiment, the account CPA also anonymizes the data reports by masking sensitive data such as IP addresses and user names. In this embodiment, the account CPA retains the masked knowledge to enable remediation activities to be directed toward the correct system servers.

Each account CPA may collect scan reports from multiple endpoint devices. The method pre-processes and analyzes each report as described, and the method passes the results to a regional level CPA for further analysis and remediation activities.

In an embodiment, the method further analyzes each scan report to yield a normalized report document. In this embodiment, the method removes any compliance deviation scaling issues associated with differences in server configurations and scanning scripts. In this embodiment, the normalized documents retain data regarding the compliance deviation such as the regulation or policy violated as well as the nature of the deviation. In this embodiment, the method creates a set of normalized documents and passes them along for clustering. In an embodiment, the normalization occurs at the account CPA level. In an embodiment, the normalization occurs at the regional CPA level. The method selects the location of the normalization activities according to the availability of the resources necessary to conduct the normalization analysis (local, edge cloud, or cloud resources as an example).

In an embodiment, the regional CPA processes the normalized reports. In an embodiment, the processing includes natural language processing (NLP) to define a set of vectors describing each of the documents. In this embodiment, the NLP includes removal of "stop words" (low content words such as "a", "an", "in", etc), tokenization—breaking the document up into its individual words after removal of the stop words, lemmatization—generating the root form of the words identified in the tokenization—and tf-idf (term frequency-inverse document frequency) to determine the importance of each word to the overall document and across the documents. In this embodiment, the method uses comparisons of the data from the NLP for respective pairs of documents to determine a distance between each pair of documents. The determined distance provides an objective measure of the similarity between a pair of documents. Similar documents have a short distance between them, with the distance increasing as the level of document similarity diminishes. The determined distance enables the respective report documents to be compared and the comparisons recorded as a distance value between respective pairs of nodes of a distance matrix. Documents are then grouped (clustered) according to the distance between them. Documents are clustered with nearby documents and are not clustered with remote documents.

In an embodiment, a clustering algorithm of the method groups documents into clusters according to the distances between documents from the difference matrix. In this embodiment, the method determines clusters using a maximum distance between documents. In this embodiment, the clustering yields clusters, or sets, of servers having similar deviation reports and common deviations (due to the use of NLP data to derive the difference matrix values).

In an embodiment, a hierarchical clustering algorithm of the method begins with deviation—server data pairs parsing the deviation for each server into individual data points identifying the deviation and the associated server. The method then forms clusters by iterating across the set of data pairs to remove stop words, then lemmatize the deviation data. In this embodiment, the method then calculates tf-idf scores for the data by common servers and calculates difference matrix values according to the tf-idf scoring. The method then forms clusters at the shortest distance values of the matrix. In this embodiment, the method merges clusters, and repeats the process until there is no change in clusters with an increase in matrix distance values.

In an embodiment, the method iteratively determines the clusters using differing values of the maximum difference and a cost function minimizing the total number of clusters based upon the threshold maximum distance. In an embodiment, the clustering uses differing maximum document distances and iterates to achieve a pre-determined threshold number of clusters set by a user. One of ordinary skill in the art will appreciate that the different threshold level may be set by the user for the number of clusters based upon a desire to increase or decrease the size of the deviation profile summary report.

In an embodiment, the method utilizes a cluster threshold parameter value in determining the clusters. In this embodiment, the parameter value relates to the level of similarity between cluster endpoint members. Varying the parameter value changes the number of clusters into which the method groups the endpoints. In an embodiment, the parameter threshold value is set by a user and the method determines clusters until the threshold value is satisfied. In this embodiment, the method calculates a clustering parameter value for a set of clusters and compares the calculated value with the user defined threshold. In this embodiment, the method calculates the parameter value as the sum of the server level deviation divided by the number of servers in the cluster.

A calculated parameter value of 0, indicates each cluster member has an identical deviation profile and no member has an individual server profile beyond the common deviation profile. For a very large parameter value, e.g., 10, the method may return a single cluster. For some single clusters resulting from a large parameter value, the common deviation profile may be empty. Clustering provides no advantages when such a large parameter value is used.

In an embodiment, the method iteratively determines the clusters using the parameter value. In this embodiment, the method starts with the clustering threshold parameter value at a value of 0 and increases the parameter in increments of 0.25. In this embodiment, the method determines clusters using different maximum distances and then calculates cluster parameter values for the set of determined clusters. The method uses the clustering parameter in conjunction with the desired number of clusters set by the user to evaluate the deviation report distance matrix data. As an example, a cluster parameter of 0 may yield more clusters than the user has specified. In this example the method increments the threshold for the parameter and determines clusters using a different maximum distance. This process continues until the method determines the number of clusters specified by the user. In an embodiment, the method generates a report providing the changes in the number of determined clusters according tot the clustering threshold parameter, enabling the user to balance the number of clusters against the common and server deviation profiles of the clusters.

In an embodiment, the method evaluates the servers of each cluster as a group to determine the set of deviations common to all members of the cluster—cluster level, or common, deviations. The method further evaluates each server of each cluster to identify those deviation unique to the server—non-common, or server level, deviations. The method generates a cluster deviation profile, reporting the common deviations for the cluster as well as providing server level deviation reports including the non-common deviations noted for each server of the cluster. In an embodiment, the method presents the cluster deviation profiles to a user via the GUI of the system.

In an embodiment, the method evaluates the common server deviation profiles of the clusters. In this embodiment, the method generates remediation scripts for each cluster according to the common server profiles of the cluster. In this embodiment, the method further generates server specific scripts for each server to remediate the non-common server deviations. In this embodiment, the method integrates the server level remediation scripts with the cluster level common server deviation scripts to create a set of server level remediation scripts for the cluster. In an embodiment, the method retains the server level and cluster level remediation scripts as independent scripts. In an embodiment, the method stores generated scripts in a script data base for future use.

In an embodiment, the method tracks policy and regulation versions according to the deployment timeline across the systems servers. In this embodiment, the system reconciles changes in server deviation profiles with new or revised policy deployments. In this embodiment, the system stops remediation activities associated with the new policy when a strong correlation between policy deployment and deviation profile changes, regarding the deployed policy, is noted. In this embodiment, the method presumes that such a correlation indicates a flaw, or bug, in the new or revised policy, leading to the alteration in the server deviation profile.

In an embodiment, the method evaluates the server level deviation reports in view of the deviation report history for each server of the system. In this embodiment, the method identifies servers with changes in this deviation profile from the previous compliance scans. In this embodiment, the method highlights servers with changes in their deviation profile, due to changes in operational activity indicated by the change in deviation profile, for the user.

In an embodiment, the method generates a summary report of the clustered deviations for the user. The summary report provides the user a cluster level view of common deviations across the system as well as providing the more granular server level deviations for the non-common violations for each server. In an embodiment, the summary report is provided to the user by way of the system GUI, or by a document forwarded to the user or placed in a repository. In this embodiment, the method then sends the user a link to the new report document placed in the repository.

In an embodiment, the method passes the cluster and server level remediation scripts from the regional CPA to the account CPA. In an embodiment, the method automatically executes the remediation scripts to remediate the deviations of the servers. In this embodiment, clusters having only common deviations execute a cluster level script across all members of the cluster. In an embodiment, the clusters are distributed across multiple account CPAs and the method passes the same cluster script to each of the affected account CPAs.

In an embodiment, the method tracks the behavior of system users with regard to decisions to remediate or override deviations. In this embodiment, the method models the users' behavior together with the server configurations and deviations. The method uses the model to make recommendations to the user when similar server configuration—deviation circumstances arise in future scanning activities.

In an embodiment, the method passes the scripts from the regional CPA to the account CPAs but the scripts are not automatically executed. In this embodiment, the user reviews the summary deviation report and selects remediation scripts for execution. In this embodiment, the user also selects deviations for override. In this embodiment, the method then sends instructions to the account level CPAs to execute the approved scripts and to override the indicated violations.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects to server sub-system 102 via network 114. Client devices 104 and 110 comprise continuous compliance program (not shown) together with sufficient computing resource (processor, memory, network communications hardware) to execute the program. In an embodiment, client devices 104 and 110 constitute managed endpoint devices subject to the continuous compliance activities of the disclosed inventions. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the continuous compliance program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., continuous compliance program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
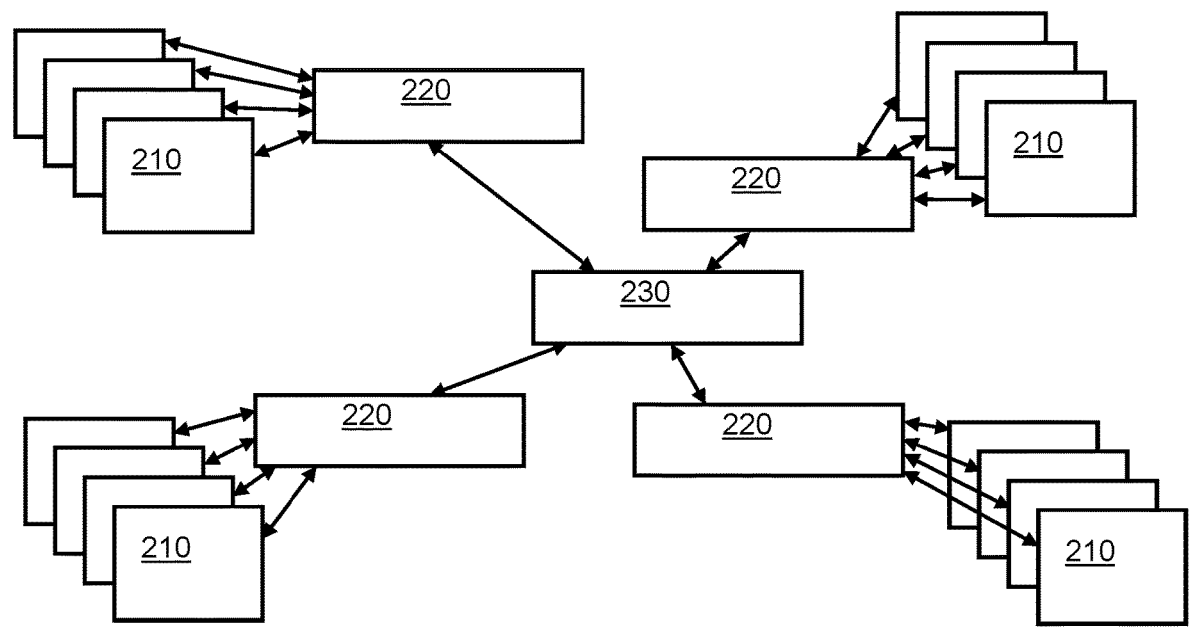
FIG. 2 provides a schematic illustration of a system architecture, according to an embodiment of the invention.

FIG. 2 provides a schematic architecture 200, illustrating exemplary components associated with the practice of the disclosure and their relationships. As shown in the figure, each account CPA 220, connects to multiple endpoint devices 210, to scan the endpoint devices for compliance deviations. The multiple account CPAs 220 are in turn connected to a regional CPA 230, and report the endpoint device 210 compliance deviation scan reports to the regional CPA 230. In an embodiment, the account CPAs 220 further de-duplicate, normalize, and anonymize the endpoint device 210 scan reports before sending them to the regional CPA 230. In this embodiment, the regional CPA 230 analyzes the reports using NLP, clusters the analyzed data and generates a compliance deviation summary for presentation to a user. In this embodiment, the regional CPA 230 further generates scripts for remediating the deviations and passes cluster and server level scripts to the account CPAs 220. In an embodiment, the method stores the generated scripts in a repository (script database) for use in remediating identical deviations later. In an embodiment, the scripts are automatically executed to remediate the deviations. In an embodiment, a user approves execution of the scripts.

Figure 3A:
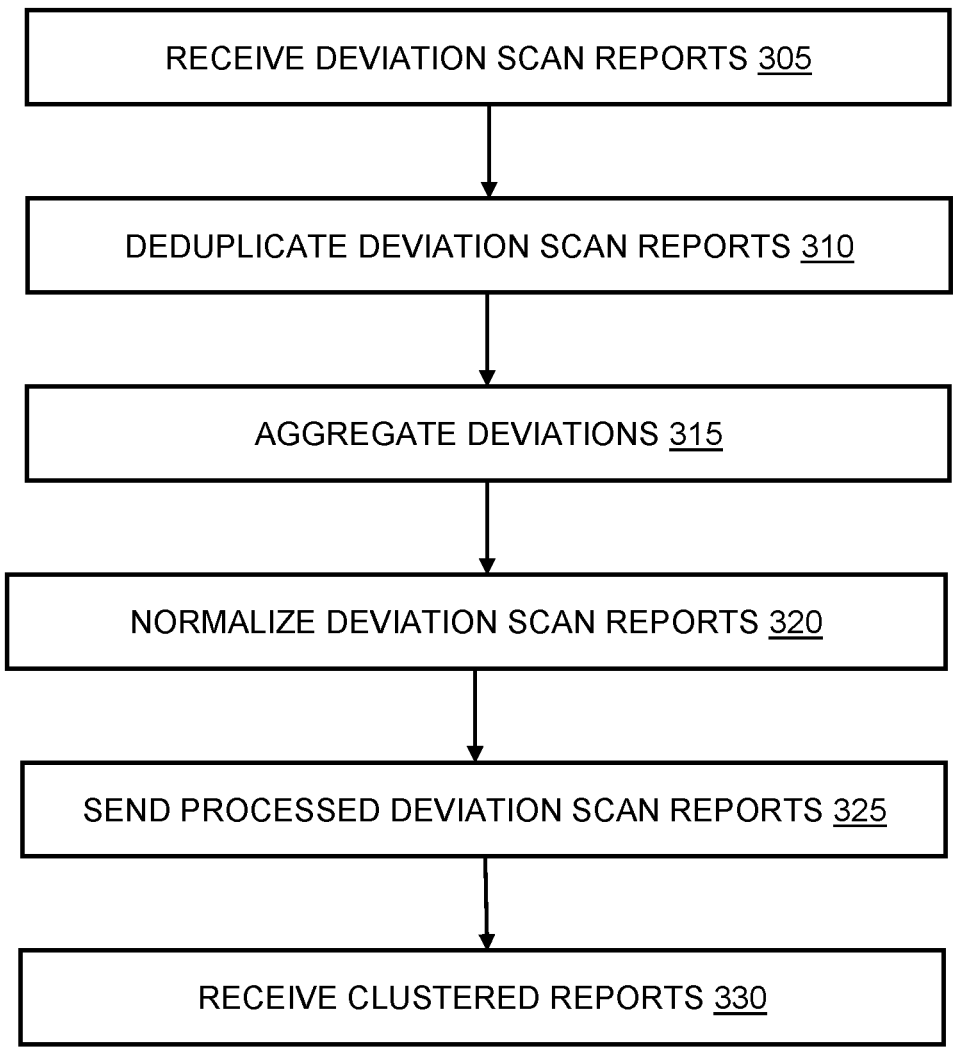
FIGS. 3a and 3b provide flowcharts depicting operational sequences, according to an embodiment of the invention.
Figure 3B:
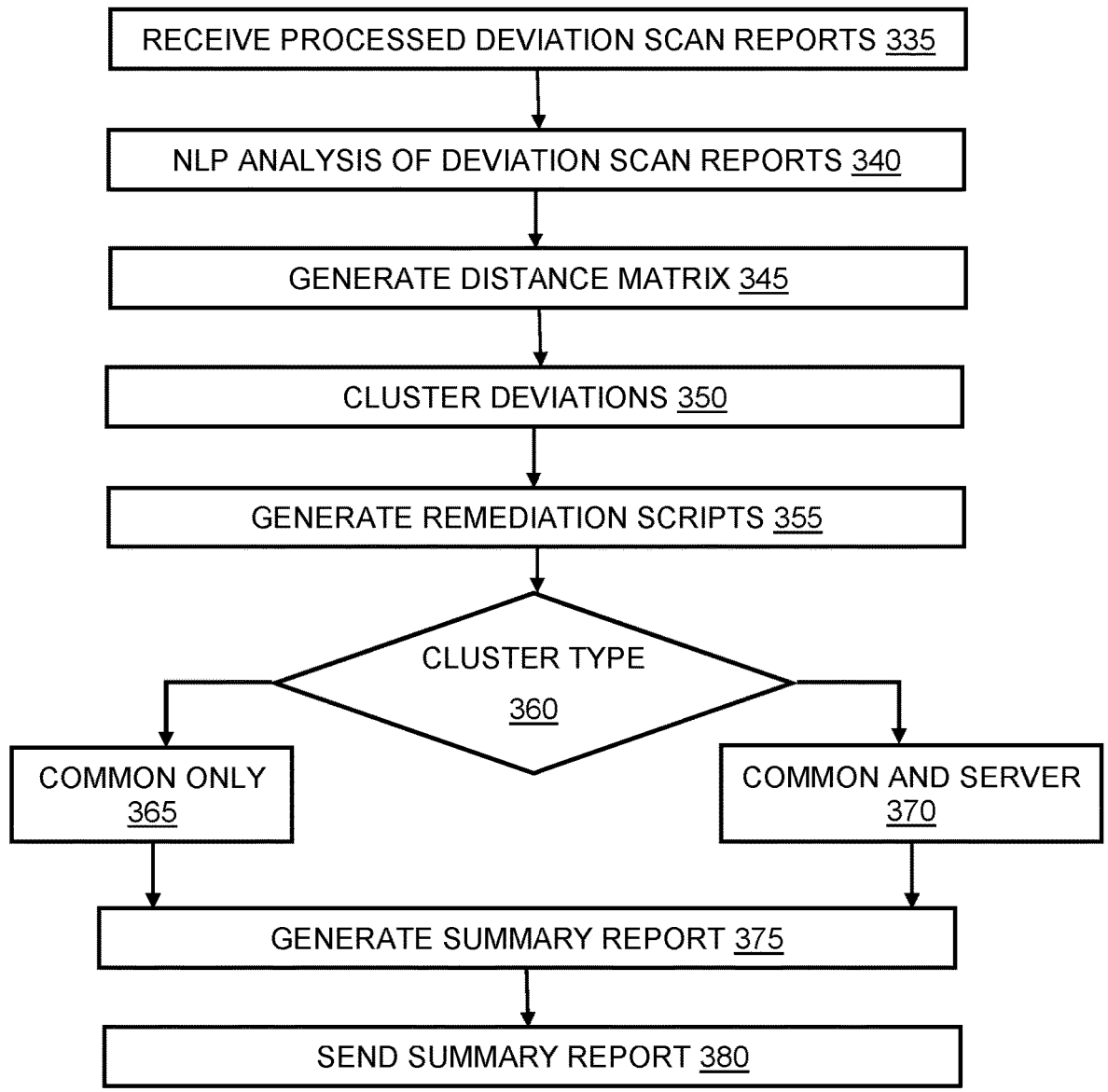

FIGS. 3a and 3b provide flowcharts 300a and 300b illustrating operational steps associated with an embodiment of the invention. As shown in flowchart 300a, of FIG. 3a, for the account CPA, at 305, the method receives compliance deviation scan reports from the endpoint devices monitored by the account CPA. At 310, the method de-duplicates the reports. As an example, multiple identical scan reports for a single asset, all made since the last remediation or overriding activity for the asset, may be received by the account CPA. At this step, the method removes the duplicate reports, leaving a single report of deviations since the last remediation, override activity. At 315, the method aggregates large numbers of deviations associated with one policy into a single report data point—e.g., multiple security policy deviations are aggregated as single reported deviation associated with the policy. At 320, the method normalizes the reports, e.g., scaling all deviations to a 0-1 scale in one embodiment, and anonymizes sensitive data within the reports—IP addresses, used IDs, etc. At 325, the method sends the set of normalized, de-duped, aggregated, and anonymized reports to the regional CPA. In an embodiment, the regional CPA process the reports received from the account CPAs, resulting in clustered deviation reports and associated cluster and server level remediation scripts as described below. At 330, the method receives the clustered deviation reports together with cluster and server level remediation scripts, from the regional CPA. For systems with CC, steps 305-330 repeat at the account CPA.

As shown in flowchart 300b, of FIG. 3b, for the regional CPA, at 335 the regional CPA receives the normalized, aggregated, de-duped, and anonymized compliance scan reports from the account CPAs. At 340, the method uses NLP to analyze the reports, yielding deviation—server data pairs. In this embodiment, the method uses NLP to define a set of vectors describing each of the documents. In this embodiment, the NLP includes removal of "stop words" (low content words such as "a", "an", "in", etc), tokenization—breaking the document up into its individual words after removal of the stop words, lemmatization—generating the root form of the words identified in the tokenization—and tf-idf (term frequency—inverse document frequency) to determine the importance of each word to the overall document and across the documents. At 345, the method processes the deviation—server data pairs in the output of the NLP using tf-idf yielding a distance matrix for the reports. At 350, the method uses a hierarchical clustering algorithm to cluster the reports using the tf-idf results. At 355 the method generates remediation scripts for the cluster and server level deviations.

At 360, the method evaluates the clusters to determine if there are common deviations only, or a combination of common and server level deviations. In this embodiment, the common deviations clusters contain only the same deviations for each cluster member and no server specific deviations. At 365, the method generates a summary deviation report for each of the common deviations-only cluster. This report is equivalent to the deviation report from any of the cluster member servers as each server's deviation report contains the same common deviations.

For each common and server level deviation cluster, at 370, the method generates a summary report as the combination of the common deviations in the cluster plus the individual server deviations for each server member of the cluster. At 375, the method combines and normalizes the sets of common deviation only and common plus server deviations reports into a single summary report. The method sends the single summary report to the user via a system GUI at 380. In an embodiment, the method sends the summary report to each account CPA together with remediation scripts for the deviations at 385. In an embodiment, (not shown) the method parses the report according to the endpoints served by each account CPA and only those portions relevant to individual account CPAs and downstream endpoint devices are sent to the respective account CPAs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
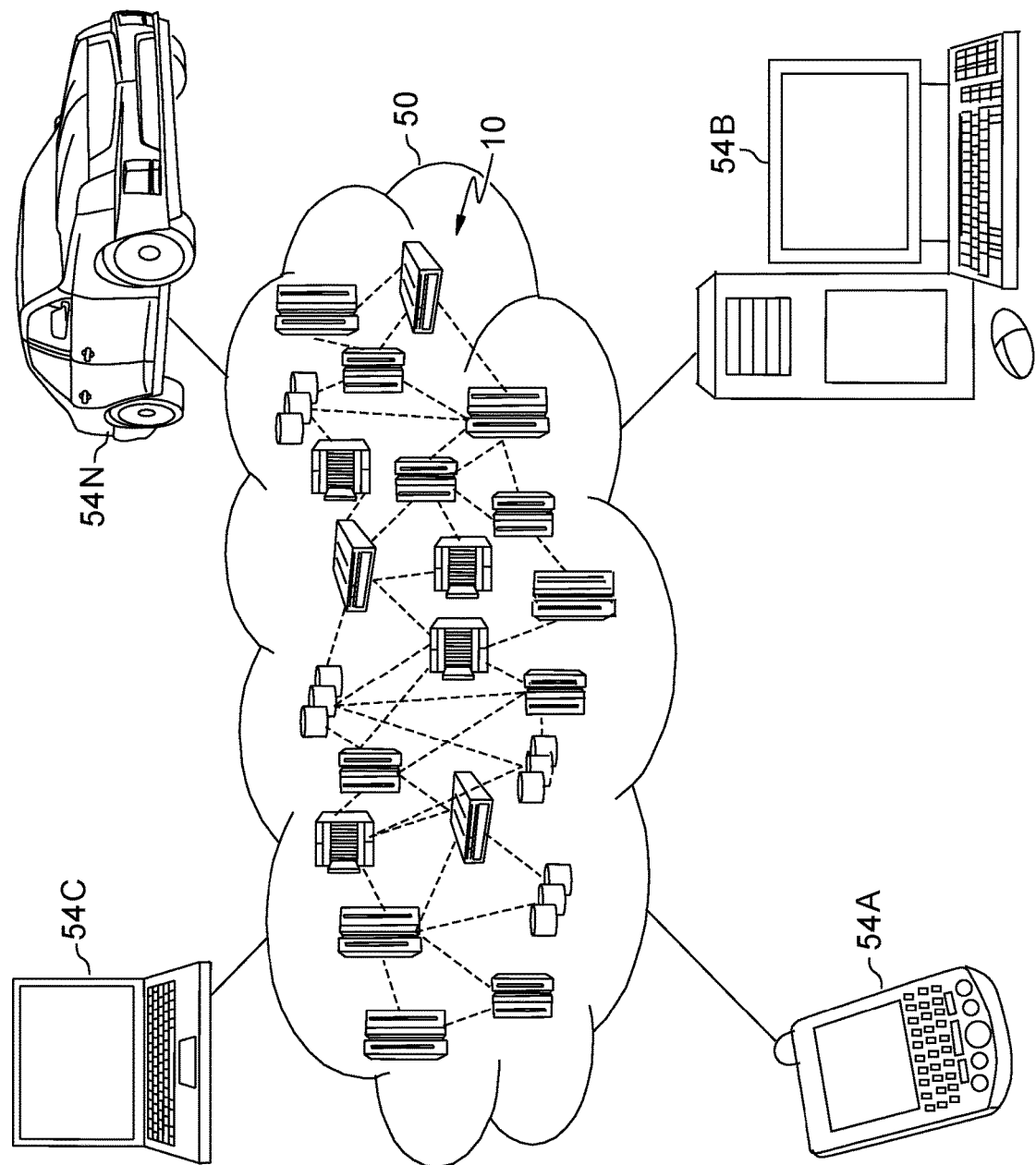
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
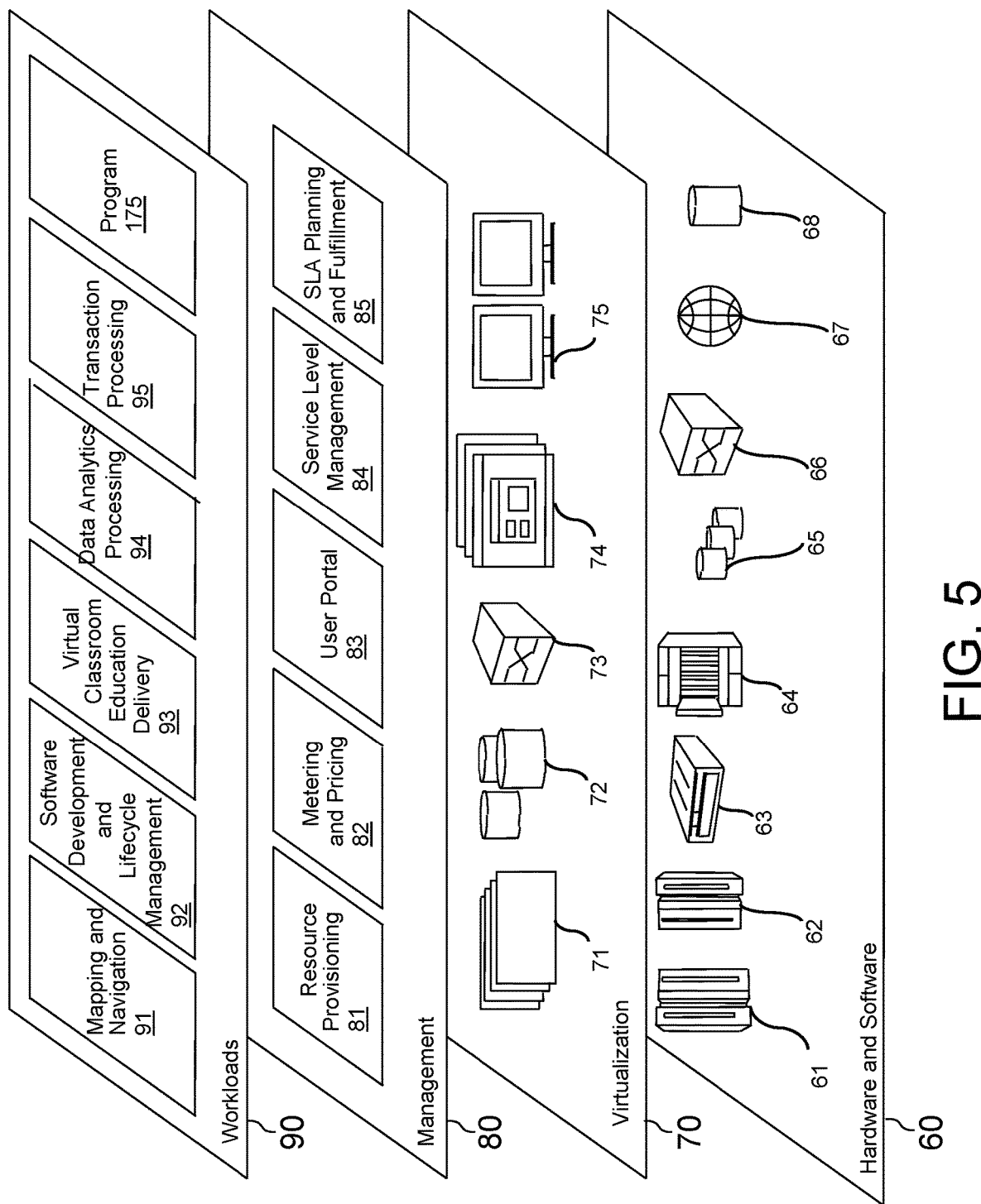
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and continuous compliance program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for clustering compliance deviations, the method comprising:
   scanning, by one or more processor, servers using scan scripts according to server configurations;
   receiving, by one or more computer processors, inspection scan compliance deviation report data according to the scan scripts;
   analyzing, by the one or more computer processors, the inspection scan compliance deviation report data;
   in response to the analyzing, creating, by the one or more computer processors, normalized deviation report documents;
   comparing, by the one or more computer processors, the normalized deviation report documents;
   in response to the comparing, clustering, by the one or more computer processors, the normalized deviation report documents;
   creating, by the one or more computer processors, a common cluster deviation profile comprising clustered deviation reports;
   generating a remediation script for a cluster according to a common server profile;
   executing the remediation script; and
   generating, by the one or more computer processors, a summary system asset compliance report comprising the common cluster deviation profile.

2. The computer implemented method according to claim 1, further comprising aggregating, by the one or more computer processors, the compliance deviation report data according to compliance deviations.

3. The computer implemented method according to claim 1, further comprising:
   generating, by the one or more computer processors, remediation scripts for a cluster's assets according to the common cluster deviation profile; and
   automatically executing, by the one or more computer processors, the remediation scripts.

4. The computer implemented method according to claim 1, further comprising creating, by the one or more computer processors, a distance matrix of normalized deviation report documents.

5. The computer implemented method according to claim 4, further comprising comparing, by the one or more computer processors, normalized deviation report documents according to the distance matrix associated with the normalized deviation report documents.

6. The computer implemented method according to claim 5, further comprising iteratively clustering, by the one or more computer processors, the normalized deviation report documents according to a maximum distance between nodes of the distance matrix.

7. The computer implemented method according to claim 6, further comprising iteratively clustering, by the one or more computer processors, the normalized deviation report documents according to a total number of deviations per cluster.

8. A computer program product for clustering compliance deviations, the computer program product comprising one or more computer readable storage devices and stored program instructions on the one or more computer readable storage devices, the stored program instructions comprising:
   programmed instructions for receiving inspection scan compliance deviation report data;
   program instructions for analyzing the inspection scan compliance deviation report data;
   program instructions for creating normalized deviation report documents in response to the analysis;
   program instructions for comparing the normalized deviation report documents;
   program instructions for clustering the normalized deviation report documents in response to the comparisons;
   program instructions for creating a common cluster deviation profile comprising clustered deviation reports;
   program instructions for generating a remediation script according to a common server profile;
   executing the remediation script; and
   program instructions for generating a summary system asset compliance report comprising the common cluster deviation profile.

9. The computer program product according to claim 8, further comprising program instructions for aggregating the compliance deviation report data according to compliance deviations.

10. The computer program product according to claim 8, further comprising:
    generating remediation scripts for a cluster's assets according to the common cluster deviation profile; and
    automatically executing the remediation scripts.

11. The computer program product according to claim 8, further comprising program instructions for creating a distance matrix of normalized deviation report documents.

12. The computer program product according to claim 11, further comprising program instructions for comparing normalized deviation report documents according to the distance matrix associated with the normalized deviation report documents.

13. The computer program product according to claim 12, further comprising program instructions for iteratively clustering the normalized deviation report documents according to a maximum distance between nodes of the distance matrix.

14. The computer program product according to claim 13, further comprising program instructions for iteratively clustering the normalized deviation report documents according to a total number of deviations per cluster.

15. A computer system for clustering compliance deviations, the computer system comprising:
   one or more computer processors;
   one or more computer readable storage devices; and
   stored program instructions on the one or more computer readable storage devices for execution by the one or more computer processors, the stored program instructions comprising:
      programmed instructions for receiving inspection scan compliance deviation report data;
      program instructions for analyzing the inspection scan compliance deviation report data;
      program instructions for creating normalized deviation report documents in response to the analysis;
      program instructions for comparing the normalized deviation report documents;
      program instructions for clustering the normalized deviation report documents in response to the comparisons;
      program instructions for creating a common cluster deviation profile comprising clustered deviation reports;
      program instructions for generating a remediation script according to a common server profile;
      executing the remediation script; and
      program instructions for generating a summary system asset compliance report comprising the common cluster deviation profile.

16. The computer system according to claim 15, further comprising program instructions for aggregating the compliance deviation report data according to compliance deviations.

17. The computer system according to claim 15, further comprising:
   generating remediation scripts for a cluster's assets according to the common cluster deviation profile; and
   automatically executing the remediation scripts.

18. The computer system according to claim 15, further comprising program instructions for creating a distance matrix of normalized deviation report documents.

19. The computer system according to claim 18, further comprising program instructions for comparing normalized deviation report documents according to the distance matrix associated with the normalized deviation report documents.

20. The computer system according to claim 19, further comprising program instructions for iteratively clustering the normalized deviation report documents according to a maximum distance between nodes of the distance matrix.

* * * * *